US009310805B2

(12) United States Patent
Muller et al.

(10) Patent No.: US 9,310,805 B2
(45) Date of Patent: Apr. 12, 2016

(54) METHOD AND SYSTEM FOR MANEUVERING A MOBILE MINING MACHINE IN A TUNNEL AND A MOBILE MINING MACHINE

(71) Applicant: Atlas Copco Rock Drills AB, Orebro (SE)

(72) Inventors: Christoph Muller, Westerkappeln (DE); George Biro, Ladbergen (DE)

(73) Assignee: Atlas Copco Rock Drills AB, Orebro (SE)

( * ) Notice: Subject to any disclaimer, the term of this patent is extended or adjusted under 35 U.S.C. 154(b) by 0 days.

(21) Appl. No.: 14/396,447

(22) PCT Filed: Apr. 25, 2013

(86) PCT No.: PCT/SE2013/050461
§ 371 (c)(1),
(2) Date: Oct. 23, 2014

(87) PCT Pub. No.: WO2013/165303
PCT Pub. Date: Nov. 7, 2013

(65) Prior Publication Data
US 2015/0094913 A1     Apr. 2, 2015

(30) Foreign Application Priority Data

May 2, 2012 (SE) ...................................... 1250435

(51) Int. Cl.
*B62D 12/00*     (2006.01)
*G05D 1/02*      (2006.01)
*B62D 6/00*      (2006.01)

(52) U.S. Cl.
CPC *G05D 1/024* (2013.01); *B62D 6/00* (2013.01); *G05D 1/0238* (2013.01); *G05D 1/0248* (2013.01); *G05D 2201/021* (2013.01)

(58) Field of Classification Search
CPC combination set(s) only.
See application file for complete search history.

(56) References Cited

U.S. PATENT DOCUMENTS

| | | |
|---|---|---|
| 4,465,155 A | 8/1984 | Collins |
| 4,847,769 A | 7/1989 | Reeve |
| 4,920,520 A | 4/1990 | Gobel et al. |
| 5,099,885 A | 3/1992 | Nilsson |
| 5,751,211 A | 5/1998 | Shirai et al. |

(Continued)

FOREIGN PATENT DOCUMENTS

| | | |
|---|---|---|
| GB | 2 390 348 | 1/2004 |
| WO | WO 02/30792 | 4/2002 |

(Continued)

*Primary Examiner* — Edward J Pipala
(74) *Attorney, Agent, or Firm* — Mark P. Stone

(57) ABSTRACT

Method of maneuvering a mobile mining machine including two or more self steered and optionally self propelled interconnected units being connected as train units over a respective articulating joint, said mobile mining machine having a forward and a backward direction, wherein in a tunnel following mode the method includes: producing a set of first signals representative of sideward distances between at least one side of the mobile mining machine and a respective nearby wall of said tunnel, and—evaluating said set of first signals so as to determine a sideways position of the mobile mining machine in respect of the walls of said tunnel during driving, and—producing steering commands to be sent to a propulsion arrangement in order to maintain a position of the mobile mining machine to ensure clearance to tunnel walls during driving. The invention also relates to a system and a mobile mining machine.

22 Claims, 1 Drawing Sheet

(56) References Cited

U.S. PATENT DOCUMENTS

| | | |
|---|---|---|
| 6,062,801 A | 5/2000 | Cooper |
| 6,349,249 B1 | 2/2002 | Cunningham |
| 6,361,269 B1 | 3/2002 | Cooper |
| 6,898,503 B2 | 5/2005 | Makela et al. |
| 7,392,151 B2 | 6/2008 | Makela |
| 7,603,235 B2 | 10/2009 | Makela et al. |
| 7,643,934 B2 | 1/2010 | Makela |
| 8,744,746 B2 * | 6/2014 | Makela ..................... 701/400 |
| 2004/0138799 A1 | 7/2004 | Makela et al. |
| 2005/0283294 A1 | 12/2005 | Lehman, Jr. et al. |
| 2009/0043439 A1 | 2/2009 | Barfoot et al. |

FOREIGN PATENT DOCUMENTS

| | | |
|---|---|---|
| WO | WO 02/093282 | 11/2002 |
| WO | WO 2004/086084 | 10/2004 |
| WO | WO 2009/145694 | 12/2009 |
| WO | WO 2009/145695 | 12/2009 |
| WO | WO 2010/020359 | 2/2010 |

* cited by examiner

METHOD AND SYSTEM FOR MANEUVERING A MOBILE MINING MACHINE IN A TUNNEL AND A MOBILE MINING MACHINE

FIELD OF THE INVENTION

The invention relates to a method and a system for maneuvering a mobile mining machine in a tunnel, a gallery or the like. The invention also relates to a mobile mining machine.

BACKGROUND OF THE INVENTION

In underground mining, free moving machines and vehicles are usually moved either on wheels or by crawlers. Bigger scale mobile mining machines, however, are too large and too heavy to be moved on one single crawler. Due to the length of such a machine, several crawlers are required and machine wagons are supported on these crawlers. The wagons are mechanically interconnected, like a conventional train. In contrast to a conventional train, however, the crawlers are not moving on tracks so they can not simply be pulled by a locomotive. Instead, every crawler has to be equipped with an individual power source to provide the moving power. Furthermore, each crawler has to be equipped with an individual side steering using crawler belts having individual movement capabilities to move the wagon sideways.

In respect of a previously known existing solution, each wagon or train unit has to be controlled individually by manual means, e.g. by a person issuing manual control commands for thrust and direction to each vehicle. This leads to slow and unsecure operation.

A method of steering a continuous haulage apparatus having mutually interconnected units is described in WO0230792. However this method is disadvantageous in that it requires a quite complex structure of the apparatus. Furthermore, for automated control, it requires sweeping sensors such as laser scanners on either side of each train unit. The scans from the laser scanners need to be fusioned in a very computing intense manner. This is difficult and expensive to perform in real time on a machine taking into account safety requirements that have to be followed.

Another example of the background art is U.S. Pat. No. 5,999,865. The system according to this document i.a. comprises a storage device containing a set of interlinking nodes that represent at least one path through passageways, and a processor for comparing distance of the sidewalls of the passageways and the interlinking nodes for steering and instructing the vehicle to operate.

Aim and Most Important Features of the Invention

It is an aim of the invention to provide a method and a system for maneuvering a mobile mining machine that at least addresses the problems of the background art and in particular is more economically operated and is more reliable.

These aims are obtained through a method and a system as indicated above through the features of the independent claims.

The term "maneuvering" is here is intended to include: navigating, steering and maneuvering.

The inventive method of maneuvering a mobile mining machine including two or more self steered and optionally self propelled interconnected units being connected as train units over a respective articulating joint in a tunnel following mode thus includes:

producing a set of first signals representative of sideward (lateral) distances between at least one side of the mobile mining machine and a respective nearby wall of said tunnel, and evaluating said set of first signals so as to determine a sideways position of the mobile mining machine in respect of the walls of said tunnel during driving and producing steering commands to be sent to a propulsion arrangement in order to maintain a position of the mobile mining machine to ensure clearance to tunnel walls during driving.

Hereby, especially the side steering of a train of mechanically interconnected crawler units can be synchronized with the controlled movement (driving in both forward and backward directions) of the overall train. This is otherwise a big challenge in solutions according to the background art, which suffers from the problems especially associated with the directional steering having to take account on the crawlers being mechanically interconnected by the wagons, resulting in different steering behaviour and speed of each individual crawler during driving, especially in the curves. It has been found that the quite personnel-intensive and complicated steering process according to the background art can be dispensed with. Hereby one advantage of the invention is that the problems in connection with the manual steering method never being able to fully synchronize thrust and to fully coordinate the steering commands which sometimes may counteract each other can be avoided.

In particular, all first signals representative of sideward (lateral) distances emanate from fixed unidirectional sensors, which brings the requirements for evaluation capacity of the control system involved to a minimum and enables calculation speed to be enhanced.

By using the set of first signals from the sideward distance sensors located at the side of the machine, on each "train unit", these sensor data thus are useful for the control system to calculate an individual path for each self propelled train unit in order to make the machine move smoothly and automatically into the intended driving direction.

When each segment of a multi combination vehicle making up the mobile mining machine is equipped with at least one individual lateral sensor, and each of its individual segments are in the tunnel, this information can be used to steer the multi combination vehicle's individual units accordingly. The distance sensors located at the sides are then used for steering of the machine and its individual segments and thereby for avoiding collisions against tunnel walls.

Use of sensors on only one side of the vehicle makes it necessary to have tunnel width information in relation to machine width information obtained in advance.

It is preferred that a set of first signals are produced that are representative of sideward (lateral) distances between both sides of the mobile mining machine and the respective nearby wall of said tunnel. Then the tunnel width at a given point is easily calculated by both lateral distance sensor signal values plus the width of the machine between left and right side sideways sensors. Each measuring point plotted over the travel distance of the machine gives the tunnel width and the lateral orientation of this measuring point on the machine inside the tunnel.

In an always straight tunnel, only side wall distance sensing would be sufficient to let the machine move automatically. Since in practice, no such tunnels exist, the leading unit of the vehicle according to this aspect of the invention will have to be driven in a forward direction either manually or by another per se known control principle.

It is highly preferred that the inventive method also includes:

producing a set of second signals representative of distances from the mobile mining machine to a front wall region, to be approached during driving, through at least one fixed unidirectional distance sensor directed essentially in the direction of movement, evaluating said set of second signals so as to determine a position of the mobile mining machine in respect of the tunnel front wall ahead and creating a virtual tunnel line based on the evaluation of said set of second signals during driving, Hereby it is possible to move and maneuver the inventive machine with automatic control mode in an unknown infrastructure even in narrow tunnels or galleries using relatively uncomplicated measures.

Looking ahead of the machine in the movement direction there is at least one fixed unidirectional distance sensor used to detect the free space ahead. When the machine approaches a curve, the sensor detects that the distance to the outer side of the curve decreases. In conjunction with the steering commands and the motion of the machine, a computer is enabled to calculate said virtual tunnel line from this information. This virtual tunnel line enables the computer control system to prepare related control actions.

This principle assumes, that all curves have been checked for clearance to tram the machine through the tunnel, so the control system principle is—like when a truck driver operates a truck-trailer vehicle—to drive as far to the outer side of the curve as possible and as required to prevent from collisions of a trailer on an inner side of the curve.

When, in operation, the multi combination vehicle approaches a curve, the distance sensor (–s) in front of the machine detects the tunnel wall at the outside of the curve at a distance. The system then produces said steering commands to be sent to a propulsion arrangement of the machine. For example, hereby the control system is arranged to steer the machine straight on until the front of the machine is positioned at a determined distance from the outer tunnel wall.

During this movement, a minimum clearance to the outer side of the curve is typically maintained so that the machine is able to swing out to the outer side when starting a curve steering phase. At this point, the sideward distance sensors have already detected a significant widening of the tunnel at the inner side of the curve. Now, the machine starts swinging into the curve preferably staying with a rear portion of each unit in the outer third of the curve sequence in order to allow centre portions of the trailing units to use the inner curve space for swinging.

Using the set of second signals from the forward distance sensor (–s) allows the control system to calculate the virtual tunnel wall line by chaining up distance measurement points along the moving path of the machine and to calculate the space in front of it and thereby to estimate an outer diameter of an approaching curve.

In addition to the sensor (–s) being directed in the forward direction, the distance sensors producing the set of first signals and being located at the sides can in particular be used for enhancing detecting of the inner curve start and diameter. These sensor data are also useful for following or rather adjusting steering to said virtual tunnel line.

It is preferred that the virtual tunnel line is created based on a combinatory evaluation of said set of second signals and said set of first signals for creating said virtual tunnel line during driving, using said sets of first and second signals for producing steering commands for maneuvering the mobile mining machine towards said virtual tunnel line.

Hereby the set of first signals are advantageously used for enhancing calculation of the virtual wall line together with the set of second signals.

The invention covers basically control of a "train" of interconnected crawler or wheel based train units, each one being equipped with an individual power unit. There may be support wheels present between the power units which are self powered or unpowered, steerable or non steerable.

Altogether, the inventive method does not call for expensive laser scanners and resulting sensor signal fusion methods as is the case in respect of WO0230792. Instead, the use of relatively simple fixed front sensors that detect the walls during the very driving process makes calculations more easily accomplished in real time without having to use excessive calculation requirements, since a much smaller amount of data has to be computed, which is a great advantage over the background art.

It is not excluded that the inventive method is used also to drive the machine along a virtual tunnel line being pre-stored in a memory and that tunnel data being obtained from the evaluation during maneuvering and driving is compared with the pre-stored virtual tunnel line data, even if such pre-stored data are not necessary. This makes it possible to further reduce calculation and increase precision in such situations.

As a virtual tunnel line, one virtual tunnel wall line related to one of the tunnel side walls can be used in many cases such as when the tunnel is very wide or tunnel width is known. Normally, however, it is advantageous to use data for both tunnel side walls.

It is preferred that the set of second signals is produced by at least one forward directed spot laser distance sensor being said at least one fixed unidirectional distance sensor since this has proved to give particularly reliable results. Preferably also, the sideward directed sensors are sideways directed unidirectional distance sensors, preferably spot laser distance sensors or ultrasonic sensors.

It is preferred that, in order to increase precision, during driving, said set of first signals are evaluated also for controlling and if necessary correcting each sensor emitting another set of signals.

For increase of safety, it is preferred that if the evaluation results in determining that the mobile mining machine will not maintain clearance to the tunnel walls, a stop command is issued.

According to a preferred aspect, a set of third signals representative of angles of articulation between each trailing unit and a respective preceding unit is produced, and said set of third signals are evaluated so as to enhance determination of the sideways position of the mobile mining machine in respect of the walls of said tunnel during driving.

For this purpose, preferably, all train units are equipped with angular sensors in order to determine the actual kinematics of the machine. Optional (hydraulic or electric) actuators can be used to help to keep a planned angle between units. As an example, there can be provided an on-board kinematics model covering the machine's static components and its propulsion units (crawlers or wheel assemblies). This model can be the basis for the control of the mobile mining machine.

Per se known control algorithms can be used in respect of a control method looking ahead. The on-board control procedure is arranged to determine the orientation and the position of propulsion units. The trailing units may each have a "look forward" algorithm in order to optimize steering of the units around curves.

Preferably, different conventional measures can be used to verify the data and to enhance accuracy. Support can be had by odometers on the train units. Such additional inputs are used to enhance the accuracy of the navigation algorithm and to correct drift for consistency checking and enhancing accuracy. In case reflectors are used as artificial landmarks behind the machine in the tunnel, these reflectors can be used by vehicle drivers as steering aids in case of manual steering.

Evaluation of the respective first, second and/or third signals as well as the producing of steering commands based respectively thereon is carried out in real-time during maneuvering the mobile mining machine. This is practically possible according to the invention without having to use excessive computer capacity.

In case rearward laser scanners are used in combination with reflector poles for subsequently going backwards, newly applied reflectors do not need to be positioned by mine surveyors. They can be set up in random positions having the laser scanner to automatically find the new position if at the same time a sufficient number of other reflectors are within range of the scanner. The known positions of the existing reflectors are used to find the position of the scanner (the joint "origin"). The new reflector is visible by the scanner giving it's angular and distance information. This information in relation to the positions of the landmarks already known is the position of the new reflector.

The invention also relates to a system for maneuvering a mobile mining machine two or more self steered and self propelled interconnected units being connected as train units over a respective articulating joint, said mobile mining machine having a forward direction, the system including:
  first sensor means for producing a set of first signals representative of sideward distances between at least one side of the mobile mining machine and a respective nearby wall of said tunnel, and
  first evaluation means for evaluating said set of first signals so as to determine a sideways position of the mobile mining machine in respect of walls of said tunnel during driving, and
  means for producing steering commands and sending them to a propulsion arrangement of the mobile mining machine in order to maintain clearance to tunnel walls during driving.

It is highly preferred that the inventive system further includes:
  second sensor means being at least one fixed unidirectional distance sensor directed essentially in said forward direction for producing a set of second signals representative of distances from the mobile mining machine to a front wall region, to be approached during driving,
  second evaluation means for evaluating said set of second signals so as to determine a position of the mobile mining machine in respect of tunnel wall ahead, and to create a virtual tunnel line during driving,
said means for producing steering commands being arranged for maneuvering mobile mining machine towards said virtual tunnel line.

Further inventive system features corresponding to the above method features are within the scope of the invention.

BRIEF DESCRIPTION OF DRAWINGS

The invention will now be described in more detail at the background of embodiments and with reference to the annexed drawing, wherein.

DESCRIPTION OF EMBODIMENTS

Figure 1:
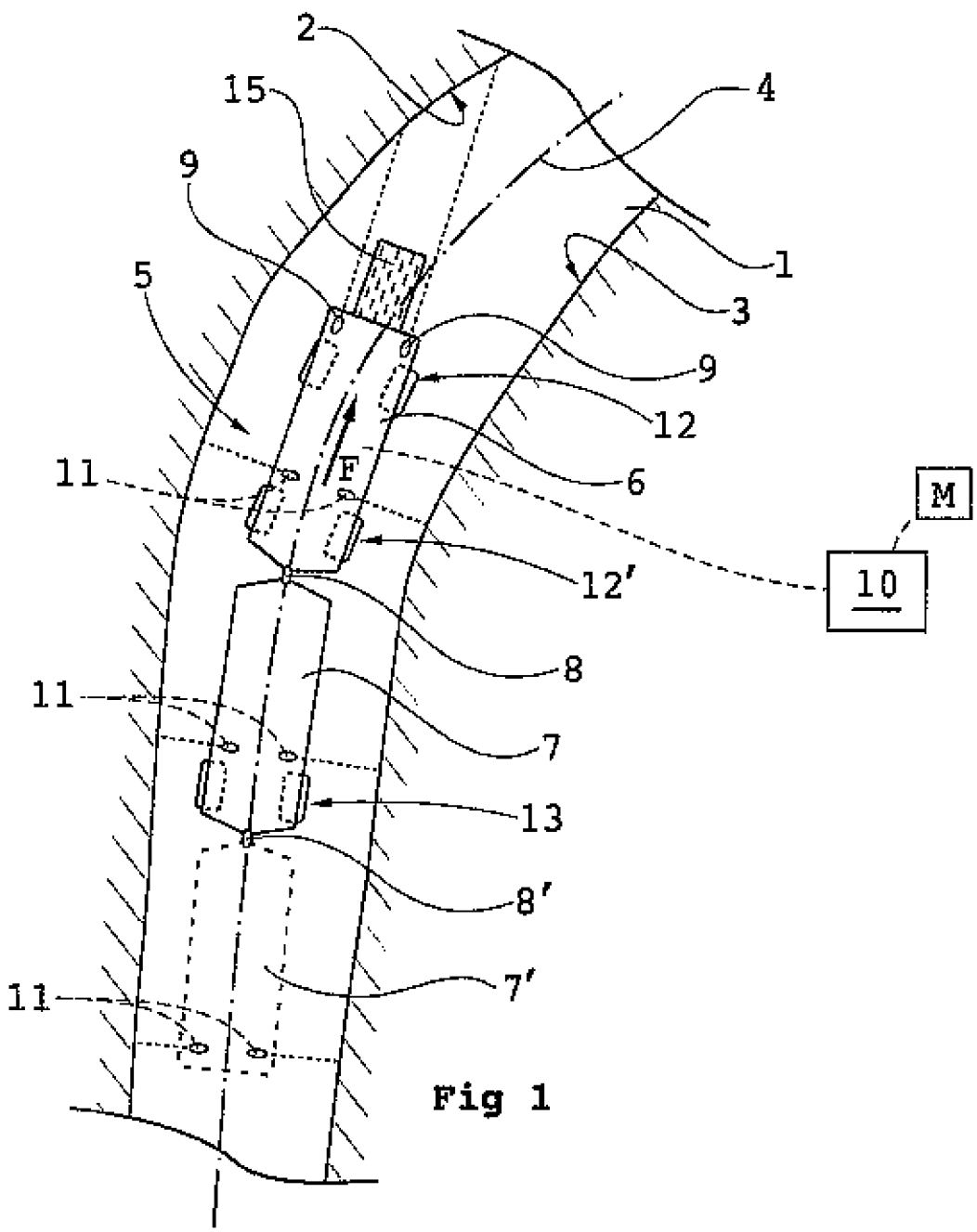
FIG. 1 shows, from the above, a mobile mining machine in a tunnel during driving.

FIG. 1 shows a tunnel having a curved tunnel passage 1 with a first inner curved side wall 2 and a second outer curved side wall 3 together forming sideward limitations of the tunnel passage 1. Inside the tunnel there is shown a moving mobile mining machine 5 during driving in a forward direction F. The mobile mining machine 5 includes a leading unit 6 which in this embodiment is a rock excavation machine having a rotatable and swingable cutting wheel 15 to be applied against a rock face to be excavated.

The leading unit 6 is connected to a first trailing support unit 7 over an articulating joint 8 in a train-like fashion. Further trailing support units can be connected rearwardly. One further trailing unit 7' is indicated with interrupted lines. A further articulating joint for connecting the first trailing support unit and the further trailing support unit is indicated with 8'.

The mobile mining machine 5 is equipped with steerable propulsion means globally referred to as a steerable propulsion arrangement, whereof the leading unit 6 is provided with a first and a second propulsion unit 12 and 12', each one being equipped with two sideward positioned crawler bands. The first trailing support unit 7 is provided with a second propulsion unit 13 which is positioned at a rear part of the first trailing support unit. The second propulsion unit 13 includes individually propelled sideward positioned crawler bands.

On the leading unit 6 there is arranged second sensor means, in this case in the form of two fixed unidirectional distance sensors 9 directed in the forward direction of the leading unit 6. The distance sensors 9 direct beams forwardly from the leading unit 6, said beams meeting the first curved side wall at positions in front of the mobile mining machine depending on the machine position and direction inside the tunnel and of course the curvature of the tunnel. The second sensor means 9 are capable of producing signals representative of the distance to points of incidence on the tunnel side wall of the respective sensor beams through per se known calculation methods.

Given that the beams are emitted continuously during driving of the mobile mining machine 5, the side wall having an inner curvature will be "detected" by the passing beams. Based on corresponding signals, which are sent to a processing unit 10, the signals are evaluated for distance to wall portions in front of the machine. According to the invention, the processing unit 10 also creates a virtual tunnel line 4 (indicated with a dot-interrupted line). This virtual tunnel line 4 which can be a tunnel centre line (as is the case in the FIG. 1 embodiment) or even a side wall line will be used by the processing unit 10 for controlling steering of the mobile mining machine when driving thereof inside the tunnel. A memory M is connected to the processing unit 10.

The leading unit 6 is also equipped with first sensor means 11, which are fixed unidirectional and directed sideways in order to measure distance to nearby side walls of the tunnel. Also the first trailing support unit 7 is provided with similar first sensor means being fixed unidirectional and directed sideways for measuring distance to a nearby side wall of the tunnel. Also optional further trailing units 7' etc. are preferably provided with similar first sensor means being fixed unidirectional and directed sideways.

The first sensor means 11 functions as safe guards against collision of the mobile mining machine against a tunnel side wall and is preferably also used for enhancing calculation of the virtual tunnel line 4. Having first sensor means directed in both sideways directions, such as in the embodiment shown in FIG. 1, measurements provided by the first sensor means 11 also immediately result in tunnel width data.

In association with the articulating joint 8 between the leading unit 6 and the first trailing support unit 7 there is arranged a third sensor means for producing a set of third signals, said third sensor means being an angular sensor sensing angular displacement between the leading unit 6 and the first trailing support unit 7. Data from this sensor can be used for enhancing accuracy in respect of driving and provide redundancy for the system.

Evaluation and combination of signals received from all sensors are preferably handled by the CPU 10 being including in a system for manoeuvring the mobile mining machine. The first, second and third evaluation means and the means for combinatory evaluation as well as the means for producing steering commands are thus normally included in the CPU.

Based on the results of the evaluation, the CPU calculates a desired route for the mobile mining machine and in particular for each unit thereof, that will result in smooth travel through the tunnel with minimised risk of units colliding with tunnel side walls during driving. Steering signals are then calculated for each propulsion unit taking into account the dimensions of each leading and trailing unit making up the mobile mining machine and also taking into account the positions of each propulsion unit on each leading and trailing unit, since that respective position is essential for how to steer the mobile mining machine.

The calculated steering commands are thereupon sent to the first propulsion unit 12 as well as to the second propulsion unit 13 being arranged at the rear portion of the first trailing support unit as well as to any further propulsion unit being arranged in association with any further trailing unit 7'. Based upon these steering commands, the individual propulsion units will be controlled so as to steer the leading and trailing units accordingly.

It is further possible to have arranged at the articulating joint 8 a power arrangement forcing the articulating joint 8 to attain a certain angle so as to assist in steering the mobile mining machine for example through a particularly abrupt curve.

The invention can be modified within the scope of the following claims and for example it is possible to have active sideways directed sensors on one side only of the mobile mining machine. It is possible to have one or more first sensors being directed forwardly, not only two such sensors.

It is also possible to drive the mobile mining machine 5 in an environment where the tunnel line is known from previous measurements. In that case the amount of calculations can be reduced and limited to verifying data pre-stored in the memory M so as to identify position along a pre-stored tunnel line.

Figure 2:
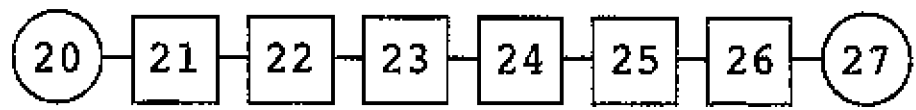
FIG. 2 illustrates diagrammatically a method sequence according to the invention.

A method sequence is diagrammatically illustrated in FIG. 2:

Position 20 indicates start of the sequence of maneuvering a mobile mining machine including a leading unit and one or more trailing units being connected over a respective articulating joint in a tunnel following mode.

Position 21 indicates producing a set of second signals representative of distances from the mobile mining machine to a front wall region through at least one fixed unidirectional distance sensor.

Position 22 indicates evaluating said set of second signals so as to determine a position of the mobile mining machine in respect of wall portions ahead and basing results of that evaluation for creating a virtual tunnel line.

Position 23 indicates producing a set of first signals representative of sideward distances between at least one side of the mobile mining machine and a respective nearby wall of said tunnel.

Position 24 indicates evaluating said set of first signals so as to determine a sideways position of the mobile mining machine in respect of the walls of said tunnel and to use the results of that evaluation for the creation of the virtual tunnel line.

Position 25 indicates producing a set of third signals representative of angles of articulation between each trailing unit and a respective preceding unit.

Position 26 indicates evaluating said set of third signals so as to enhance determination of the sideways position of the mobile mining machine in respect of the walls of said tunnel during driving.

Position 27 indicates producing steering commands to be sent to a propulsion arrangement in order to maintain a position of the mobile mining machine providing clearance to tunnel side walls during driving.

Position 28 indicates end of the sequence.

The sequence steps are repeated virtually continuously so that the machine can be driven without delay even through a tunnel having unknown layout.

The invention claimed is:

1. Method of maneuvering a mobile mining machine (5) including two are more self steered interconnected units (6, 7) being connected as train units over a respective articulating joint (8), said mobile mining machine (5) having a forward direction (F) and a backward direction, wherein in a tunnel following mode the method comprises the steps of:
   producing a set of first signals representative of sideward distances between at least one side of the mobile mining machine (5) and a respective side wall (2, 3) of said tunnel,
   evaluating said set of first signals so as to determine a sideways position of the mobile mining machine (5) in respect of the side walls (2, 3) of said tunnel during driving,
   producing steering commands to be sent to a propulsion arrangement in order to maintain a position of the mobile mining machine (5) to ensure clearance to the tunnel side walls (2, 3) during driving,
   producing a set of second signals representative of distances from the mobile mining machine (5) to a front wall region, to be approached during driving, through at least one fixed unidirectional distance sensor (9) directed essentially in said forward direction (F), and
   evaluating said set of second signals so as to determine a position on the mobile mining machine (5) in respect of said front wall ahead and creating a virtual tunnel line (4) based on the evaluation of said set of second signals during driving,
wherein the virtual tunnel line (4) is created based on a combinatory evaluation of said set of second signals and said set of first signals for creating said virtual tunnel line during driving, using said sets of first and second signals for producing steering commands for maneuvering the mobile mining machine towards said virtual tunnel line.

2. Method according to claim 1, wherein the set of second signals is produced by at least one forward directed spot laser distance sensor (9) being said at least one fixed unidirectional distance sensor (9).

3. Method according to claim 1, wherein as the virtual tunnel line (4), at least one virtual tunnel wall line (4) for one of the tunnel side walls (2, 3) is being used.

4. Method according to claim 1, wherein, during driving, said set of first signals are evaluated also for controlling and if necessary correcting each sensor emitting another set of signals.

5. Method according to claim 1, wherein, if the evaluation results in determining that the mobile mining machine (5) will not maintain clearance to the tunnel side walls (2, 3), a stop command is issued.

6. Method according to claim 1, further including the steps of:
producing a set of third signals representative of angles of articulation between each trailing unit (7) and a respective preceding unit (6), and
evaluating said set of third signals so as to enhance determination of the sideways position of the mobile mining machine (5) in respect of the side walls (2, 3) of said tunnel during driving.

7. Method according to claim 1, wherein said virtual tunnel line (4) is pre-stored in a memory (M) and that tunnel data being obtained from the evaluation during driving is compared with the pre-stored virtual tunnel line data.

8. Method according to claim 1, wherein evaluation of the respective signals and producing steering commands based thereon is carried out in real-time during maneuvering the mobile mining machine (5).

9. Method according to claim 1, wherein the step of producing said first set of signals includes producing said first set of signals through at least one fixed unidirectional distance sensor directed essentially in a sideward direction.

10. System for maneuvering a mobile mining machine (5) including two or more self steered interconnected units (6, 7) being connected as train units over a respective articulating joint (8), said mobile mining machine (5) having a forward direction (F) and a backward direction, the system comprising:
first sensor means (11) for producing a set of first signals representative of sideward distances between at least one side of the mobile mining machine (5) and a respective side wall (2, 3) of said tunnel,
first evaluation means for evaluating said set of first signals so as to determine a sideways position of the mobile mining machine (5) in respect of the side walls (2, 3) of said tunnel during driving,
second sensor means (9) being at least one fixed unidirectional distance sensor (9) directed essentially in said forward direction (F) for producing a set of second signals representative of distances from the mobile mining machine (5) to a front wall region, to be approached during driving,
second evaluation means for evaluating said set of second signals so as to determine a position of the mobile mining machine (5) in respect of said front wall ahead, and to create a virtual tunnel line (4) during driving,
means for producing steering commands and sending them to a propulsion arrangement of the mobile mining machine in order to maintain clearance to the tunnel side walls (2, 3) during driving, said means for producing steering commands being arranged for maneuvering the mobile mining machine (5) towards said virtual tunnel line (4), and
means for combinatory evaluation of said set of second signals and said set of first signals and for creating said virtual tunnel line (4) during driving, using both said sets of first and second signals for producing said steering commands for maneuvering the mobile mining machine (5) towards said virtual tunnel line (4).

11. System according to claim 10, wherein said system includes at least one forward directed spot laser distance sensor (9) being said at least one fixed unidirectional distance sensor (9).

12. System according to claim 11, wherein said first sensor means (11) are sideways directed unidirectional distance sensors, including spot laser distance sensors.

13. System according to claim 10, wherein said first sensor means (11) are sideways directed unidirectional distance sensors, including spot laser distance sensors.

14. System according to claim 10, wherein said system includes means for evaluating said set of first signals in order to also control and if necessary correct another sensor means.

15. System according to claim 10, wherein said system includes:
third sensor means for producing a set of third signals representative of angles of articulation between each trailing unit (7) and the respective preceding unit (6), and
third evaluation means for evaluating said set of third signals so as to enhance determination of a sideways position of the mobile mining machine in respect of said side walls of said tunnel during driving.

16. System according to claim 10, wherein said system includes means for safety stopping the mobile mining machine (5), said means being arranged to determine whether further driving will not maintain clearance between the mobile mining machine (5) and tunnel side walls (2, 3), and in such a case be arranged to issue a stop command.

17. System according to claim 10, wherein a memory (M) is arranged for pre-storing virtual tunnel line data and that means are arranged for comparing tunnel line data being obtained during driving with pre-stored virtual tunnel line data.

18. System according to claim 10, wherein means for evaluation of the respective signals and means for producing steering commands based thereon are arranged to work in real-time during maneuvering the mobile mining machine (5).

19. System according to claim 10, wherein said two or more self steered interconnected units (6, 7) are self propelled.

20. Mobile mining machine (5) including a system according to claim 10.

21. Mobile mining machine (5) according to claim 20 including a leading rock excavating unit (6) and one or more trailing support units (7, 7').

22. System according to claim 10, wherein said first sensor means includes at least one fixed unidirectional distance sensor directed essentially in a sideward direction.

* * * * *